United States Patent [19]

Hiraoka et al.

[11] Patent Number: 4,467,169
[45] Date of Patent: Aug. 21, 1984

[54] CYLINDER LINER

[75] Inventors: Takeshi Hiraoka; Shigeru Urano, both of Saitama; Kiyoshi Yamamoto, Chiba, all of Japan

[73] Assignee: Nippon Piston Ring Co., Ltd., Tokyo, Japan

[21] Appl. No.: 364,345

[22] Filed: Apr. 1, 1982

[30] Foreign Application Priority Data

Apr. 2, 1981 [JP] Japan .................................. 56-48458

[51] Int. Cl.³ .............................................. B23K 15/00
[52] U.S. Cl. ........................ 219/121 EB; 219/121 EM
[58] Field of Search ...... 219/121 L, 121 LM, 121 EB, 219/121 EM, 121 LY, 121 E; 178/141; 75/652 M; 92/169, 171

[56] References Cited

U.S. PATENT DOCUMENTS 4,017,708 4/1977 Engel et al. .................. 219/121 LM
4,093,842 6/1978 Scott ............................. 219/121 LM

OTHER PUBLICATIONS

*Metallurgy*, "Surface Heat Treatment of Steel to Combat Wear," Mar. 1982.

Primary Examiner—C. L. Albritton
Attorney, Agent, or Firm—Sughrue, Mion, Zinn, Macpeak, and Seas

[57] ABSTRACT

A cylinder liner is provided with a white cast iron layer formed in its inner peripheral surface in an area surrounding the top dead center position of the piston, and a thermally created layer is formed underlying the white cast iron layer. The layers may be simultaneously formed by reheating portions of the substantially finished liner with a high density heat radiation source.

6 Claims, 2 Drawing Figures

CYLINDER LINER

BACKGROUND OF THE INVENTION

If a cylinder liner is worn, combustion gas leaks at an increased rate, and deteriorates the lubricant oil; and the resulting poor lubrication promotes the wear of the cylinder liner. This is a vicious cycle which brings about the wear of the engine as a whole, and a reduction in its efficiency. The cylinder liner is usually worn more heavily in the vicinity of the top dead center position of the piston than in any other area, since in the vicinity of top dead center, the higher pressure of the combustion chamber acts on the piston ring, and causes it to contact the cylinder liner very tightly. Moreover, as only a minimum of lubricant oil is supplied in the vicinity of top dead center, the oil film is broken, which causes higher friction between the piston ring and the cylinder liner, and the heat produced by such friction causes a fusion of metal between the piston ring and the cylinder liner. This phenomenon is called scuffing, and often occurs during the initial period of engine operation. A number of proposals have hitherto been made to prevent the wear of the cylinder liner in the vicinity of the top dead center position, but none of them have been successful in providing a satisfactory cylinder liner for a high-speed and high-output engine.

The noted proposals have intended to improve the scuffing resistance of the cylinder liner by forming a high hardness layer on its inner surface by chromium plating, spray coating or selective quenching. Chromium plating is, however, ineffective against corrosive fuel, such as high lead gasoline or low quality diesel oil. A spray coated layer is low in bonding strength, and likely to crack and peel off in the vicinity of the top dead center position due to high impact stress and thermal shock. Since a cylinder liner is heavily strained and deformed if hardened as a whole, it has been proposed that it be hardened only in the vicinity of top dead center, or ports (in the case of a two cycle engine), as shown, for example, in Japanese Laid-Open Patent Specification No. 32408/76. Although the hardening of a cylinder liner certainly improves its resistance to ordinary wear, it does not greatly improve its scuffing resistance, and hardly improves its corrosion resistance over an unhardened cylinder liner. Although it is proposed in, for example, Japanese Laid-Open Patent Specification No. 137362/78 that the scuffing resistance of a cylinder liner may be improved by hardening in a special pattern, the proposed treatment is complicated. Since a cast iron cylinder liner has a base of martensite structure in which graphite and carbide are dispersed, the hardness of the hardened layer decreases with a rise in temperature, though it is high at ordinary room temperature. If a certain temperature is reached, there occurs a fushion of metal, i.e., scuffing, between the metallic base structure of the cylinder liner and the piston ring.

SUMMARY OF THE INVENTION

It is an object of this invention to provide a cylinder liner having outstanding wear resistance even when used in a high-speed and high-output engine.

The object of this invention is attained by a cylinder liner having a white cast iron layer formed by reheating and cooling in the vicinity of the top dead center position, and a thermally effected layer underlying the white cast iron layer.

DETAILED DESCRIPTION OF THE PREFERRED EMBODIMENTS

Figure 1:
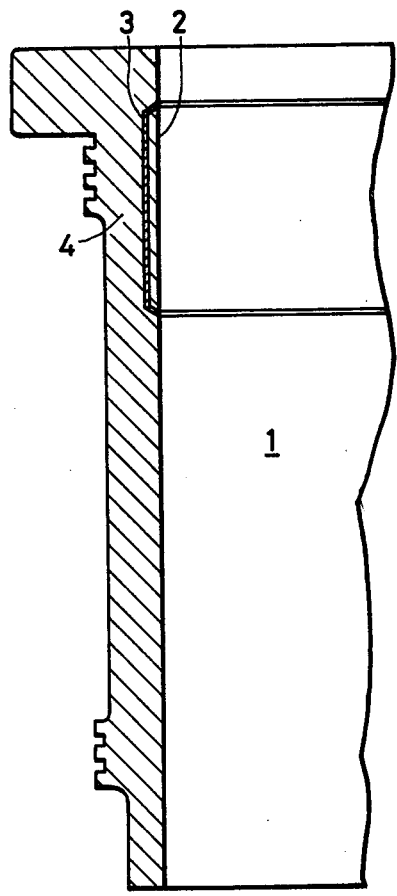
FIG. 1 is a fragmentary longitudinal sectional view of a cylinder liner embodying this invention.

Referring to FIG. 1 of the drawings, there is illustrated a cylinder liner 1 embodying this invention. It has an inside diameter of 85 mm, a height of 225 mm, a piston stroke of 110 mm, and a wall thickness of 3.5 mm. The cylinder liner 1 has a white cast iron layer 2 formed on its inner peripheral surface in the vicinity of the piston top dead center, and a thermally created layer 3 formed between the white cast iron layer 2 and the parent metal 4. The white cast iron layer 2 and the layer 3 are formed by application of an electron beam after the outer peripheral surface and both ends of the cylinder liner 1 have been finished, and its inside diameter has been finished to 84.5 mm. The electron beam 5 (FIG. 2) is applied to the inner peripheral surface of the cylinder liner 1 in an area beginning at a point 2 mm above the top dead center position and having a height of 50 mm, while the cylinder liner 1 is supported vertically, and rotated about its axis.

Figure 2:
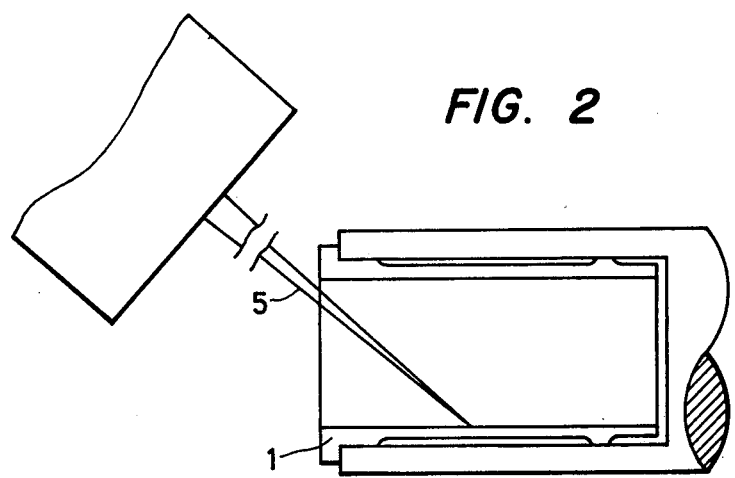
FIG. 2 is a view illustrating the process by which the white cast iron layer and the thermally effected layer in the cylinder liner of FIG. 1 are formed.

Although FIG. 2 shows the electron beam 5 applied at an angle to the inner peripheral surface of the cylinder liner 1, it is more advisable to apply the beam at right angles thereto by using a deflector. Any other source of high density heat, such as a laser or plasma, may be used instead of the electron beam. The white cast iron layer 2, which is formed in the area beginning immediately above the top dead center, and extending downward, has a height which is equal to $\frac{1}{8}$ to $\frac{1}{3}$ of the piston stroke. It has a thickness of at least 50 microns, but which does not exceed half of the wall thickness of the cylinder liner 1. The thermally effected layer 3 has a thickness of at least 30 microns. The white cast iron layer 2 and the layer 3 together have a total thickness of at least 100 microns.

The white cast iron layer comprises a fine network structure of cementite dispersed around the base metallic structure and occupying more than 50% by area thereof. Since the surface hardness and the nature of the sliding surface which it forms depend on the cementite, the surface hardness of the white cast iron layer 2 exhibits a by far lower reduction with increasing temperature than any conventionally hardened layer of metallic structure. Since cementite does not combine with any metal, scuffing hardly occurs even if the lubricant film is broken and heat is generated by local solid friction. The white cast iron layer 2 is very highly resistant to chemical corrosion by corrosive gas or liquid.

The thermally created layer 3 is a layer of material cooled rapidly between the white cast iron layer 2 and the parent metal 4 when the reheated inner peripheral surface of the cylinder liner 1 is cooled by the parent metal 4. It comprises a mixed structure of martensite and the white cast iron layer, and a structure which is similar to sorbite, and is higher in hardness than any ordinary structure formed by hardening. The layer 3, which is located between the relatively brittle white cast iron layer 2 and the relatively elastic parent metal 4, serves as a substantially rigid body which supports the white cast iron layer 2. Any thermal stress and impact that may repeatedly act on the white cast iron layer 2 in the vicinity of the top dead center is absorbed by the thermally effected layer 3, so that the white cast iron layer 2 does not crack. Therefore, the separation from the white cast iron layer 2 of fine particles that may cause abrasive wear does not occur.

The white cast iron layer is not formed during the casting operation, but is formed when the inner peripheral surface of the cylinder liner is reheated and cooled. It is, therefore, easy to control the depth of the white cast iron layer, and sufficient to provide therefor a very small dimensional allowance which does not exceed, say, 0.5 mm. These aspects are of great importance in the manufacture of a large cylinder liner.

If a white cast iron layer is formed by a chiller when a cylinder liner is cast, it is practically impossible to control the thickness of the white cast iron layer, and no thermally effected layer is formed. Even if a white cast iron layer having an increased thickness is formed instead of a thermally effected layer, it would be necessary to provide a dimensional allowance of, say, 1 mm in order to obtain a uniform circumference in view of the scale on the surface as cast, and dimensional deviations. It is practically impossible to machine the white cast iron layer by as much as 1 mm in thickness.

If the thickness of the white cast iron layer 2 is less than 50 microns, its rigidity is likely to be too low to resist abrasive wear, particularly by fine particles of combustion products in the vicinity of the top dead center. If the white cast iron layer 2 is too thick, however, the cylinder liner is brittle and weak. Therefore, the thickness thereof should be at least 50 microns, but should not exceed half of the wall thickness of the cylinder liner.

The wear of the cylinder liner in the vicinity of the top dead center can be effectively prevented if the white cast iron layer 2 is formed in an area beginning at a point immediately above the top dead center, and extending downward along a distance which is equal to at least ⅛ of the piston stroke. The height of the white cast iron layer 2 should, however, not exceed ⅓ of the piston stroke, since the reheating of such a large portion of the inner peripheral surface of the cylinder liner to form such a large white cast iron layer would cause the temperature of the liner as a whole to rise, resulting in a failure to obtain effective cooling, and properly form the white cast iron layer 2 and the thermally effected layer 3. In the event that it is necessary to provide a white cast iron layer covering the whole inner peripheral surface of a cylinder liner, it is necessary to repeat reheating and cooling several times, or cool the cylinder liner forcibly.

The layer 3 must have a thickness of at least 30 microns to provide a rigid support for the white cast iron layer 2. The white cast iron layer 2 and the thermally effected layer 3 should have a total thickness of at least 100 microns, since otherwise, the white cast iron layer 2 whould be likely to crack due to insufficient rigidity.

Wear resistance tests were conducted for the cylinder liner of this invention. Flaky graphite cast iron of the following composition (wt. %) was used to prepare cylinder liner testpieces:

| TC | Si | Mn | P | S | B | Fe |
|---|---|---|---|---|---|---|
| 3.23 | 0.02 | 0.79 | 0.29 | 0.08 | 0.07 | Balance |

Nodular graphite cast iron of the following composition (wt. %) was used to prepare piston ring testpieces:

| TC | Si | Mn | P | S | Cu | Fe |
|---|---|---|---|---|---|---|
| 3.66 | 2.41 | 0.50 | 0.09 | 0.03 | 0.60 | Balance |

Each piston ring testpiece was covered with a hard chromium plated layer having a thickness of 75 microns, and a hardness of HV 880.

Each testpiece of the cylinder liner according to this invention has a white cast iron layer having a thickness of 300 microns and a surface hardness of HV 1050, and a thermally created layer having a thickness of 200 microns, and a hardness of HV 520 at a depth of 0.4 mm. For comparison purposes, there were prepared from the same cylinder liner material untreated testpieces (Comparative Example 1), and hardened testpieces having a hardened depth of 1.3 mm and a surface hardness of HV 530 (Comparative Example 2).

TEST 1—SCUFFING RESISTANCE

Method: Each cylinder liner testpiece in the form of a rotating disk having a diameter of 135 mm was brought into contact with a stationary piston ring testpiece measuring 12 mm by 18 mm. An additional load of 5 kg was applied every ten minutes, and the load at which scuffing occurred was examined.

Test Conditions:
Sliding speed: 5 m/sec.
Lubricant: SAE #30+kerosene (1:1).

The test results are shown in Table 1.

TABLE 1

| Testpiece | Scuffing Load (kg/cm$^2$) |
|---|---|
| Invention | 104.2 |
| Comparative Example 1 | 88.0 |
| Comparative Example 2 | 90.3 |

TEST 2—CORROSION RESISTANCE

Method: Each cylinder liner testpiece in the shape of a column having a diameter of 5 mm was immersed in a corrosive liquid for four hours, while the liquid was stirred by the application of ultrasonic waves. The amount of wear was measured in terms of the reduction in weight of the testpiece. The following two types of corrosive liquids were used:

Corrosive Liquid 1: Lubricant containing 0.3% of $H_2SO_4$; and

Corrosive Liquid 2: Deteriorated oil obtained after operation with gasoline containing 4 g of lead per gallon.

The test results are shown in Table 2.

TABLE 2

| Testpiece | Proportional weight reduction relative to the testpiece of the invention | |
|---|---|---|
| | Liquid 1 | Liquid 2 |
| Invention | 100 | 100 |
| Comparative Example 1 | 160 | 190 |

TABLE 2-continued

| Testpiece | Proportional weight reduction relative to the testpiece of the invention | |
| --- | --- | --- |
| | Liquid 1 | Liquid 2 |
| Comparative Example 2 | 230 | 200 |

As is obvious from the results shown in Tables 1 and 2, the cylinder liner of this invention is very high in scuffing resistance, makes a very good combination with a chromium plated piston ring, and is about twice as high in corrosion resistance as conventional cylinder liners.

Although the invention has been described with reference to the preferred embodiment thereof, it is to be understood that modifications or variations may be easily made by one of ordinary skill in the art without departing from the scope of this invention, as defined by the appended claims.

What is claimed is:

1. A cylinder liner, comprising; a cylindrical parent metal liner body having a white cast iron layer formed on the inner peripheral surface thereof, said layer being formed in an area surrounding a top dead center position of a piston within said cylinder, and a thermally effected layer underlying said white cast iron layer, said white cast iron layer and said underlying layer being formed by irradiating a substantially finished surface of said liner body with high density heat from a heat source, and cooling said surface.

2. A cylinder liner as set forth in claim 1, wherein said white cast iron layer has a thickness of at least 50 microns, and said thermally effected layer has a thickness of at least 30 microns, and wherein said white cast iron layer and said thermally effected layer together have a total thickness which is at least 100 microns, but which is less than half of the wall thickness of said cylinder liner.

3. A cylinder liner as set forth in claim 1, wherein said white cast iron layer has a height which is within the range of ⅛ to ⅓ of the piston stroke.

4. A cylinder liner, comprising:
a cylindrical parent metal liner body having a white cast iron layer formed on the inner peripheral surface thereof, said layer being formed in an area surrounding a top dead center position of a piston within said cylinder and having a thickness of at least 50 microns and a height within the range of ⅛ to ⅓ of the piston stroke, and a thermally effected layer underlying said white cast iron layer having a thickness of at least 30 microns, and wherein said white cast iron layer and said thermally effected layer together have a total thickness which is at least 100 microns, but which is less than half of the wall thickness of said cylinder liner.

5. A cylinder liner as set forth in claim 4, said underlying layer being formed simultaneously with said white cast iron layer.

6. A cylinder liner as set forth in claim 4, said white cast iron layer beginning at a position just above said top dead center position.

* * * * *